US007815794B2

(12) United States Patent
Muniak

(10) Patent No.: US 7,815,794 B2
(45) Date of Patent: Oct. 19, 2010

(54) WATER SOFTENER SALT LOADING SYSTEM

(76) Inventor: Michael J Muniak, 1616 State Rd., Hinckley, OH (US) 44233

( * ) Notice: Subject to any disclaimer, the term of this patent is extended or adjusted under 35 U.S.C. 154(b) by 853 days.

(21) Appl. No.: 11/685,762

(22) Filed: Mar. 13, 2007

(65) Prior Publication Data
US 2008/0283454 A1    Nov. 20, 2008

Related U.S. Application Data

(60) Provisional application No. 60/781,832, filed on Mar. 13, 2006.

(51) Int. Cl.
*B01J 49/00* (2006.01)
(52) U.S. Cl. .................. 210/86; 210/191; 210/269; 210/541; 141/95; 141/98; 414/288
(58) Field of Classification Search .................. 210/86, 210/190, 269, 541, 191; 141/95, 98; 414/288; 406/171
See application file for complete search history.

(56) References Cited

U.S. PATENT DOCUMENTS

| 0,725,366 | A |    | 4/1903  | Renstrom |
| 1,079,793 | A |    | 11/1913 | Mowrey |
| 1,185,505 | A |    | 5/1916  | Hill |
| 1,513,563 | A |    | 10/1924 | Smith |
| 2,992,858 | A |    | 7/1961  | Pendleton |
| 3,260,382 | A |    | 7/1966  | Klover |
| 3,374,956 | A |    | 3/1968  | Bazilli et al. |
| 3,776,600 | A |    | 12/1973 | McLoed, Jr. |
| 4,354,776 | A |    | 10/1982 | Matsui |
| 5,445,192 | A | *  | 8/1995  | Hansen ........................... 141/2 |
| 5,709,322 | A |    | 1/1998  | Ricciardi |
| 5,996,852 | A | *  | 12/1999 | Johnson .................. 222/181.2 |
| 6,394,708 | B1 |   | 5/2002  | Braden |
| 6,561,387 | B1 | * | 5/2003  | Slawson .................. 222/181.1 |
| 7,104,743 | B2 |   | 9/2006  | Rainville et al. |

* cited by examiner

Primary Examiner—Terry K Cecil
(74) Attorney, Agent, or Firm—D.A. Stauffer Patent Services LLC

(57) ABSTRACT

Remote delivery of water softener pellets into a water softener by a vacuum. By using a vacuum the delivery system allows salt to be delivered to great distances to point of use (existing brine tank). This invention will allow people to drive into their garage close to the inventive salt loading hopper and either dump a bag of salt pellets or scoop out of it into the loading hopper, which is located a convenient minimized height off the floor. The current state prior to this invention was to carry the heavy bag of salt to the location of the water softener brine tank, which in most cases is located down the stairs in a basement.

14 Claims, 5 Drawing Sheets

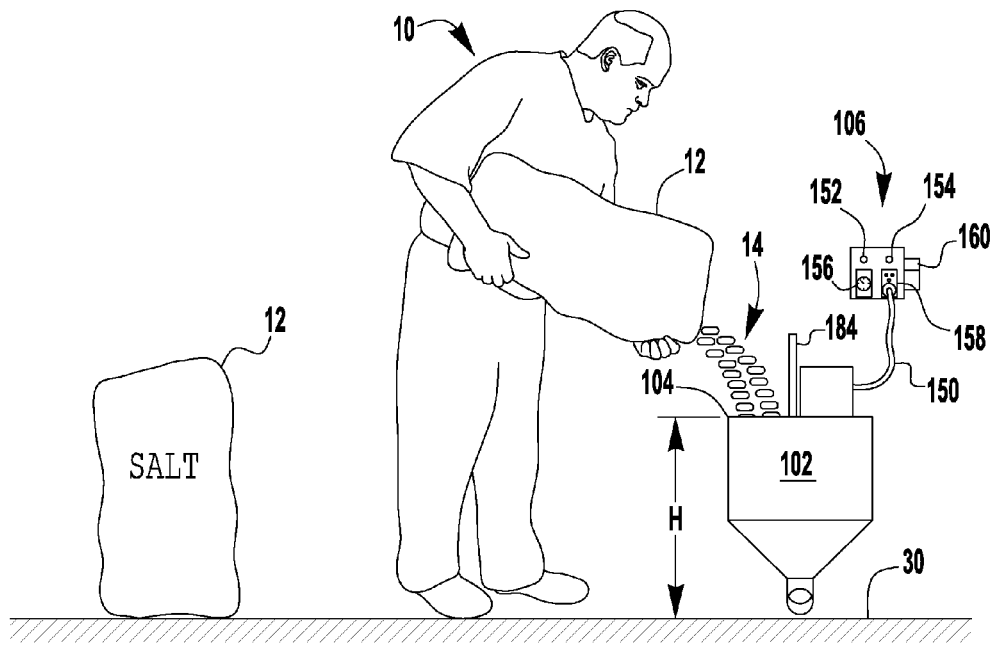
FIG. 2
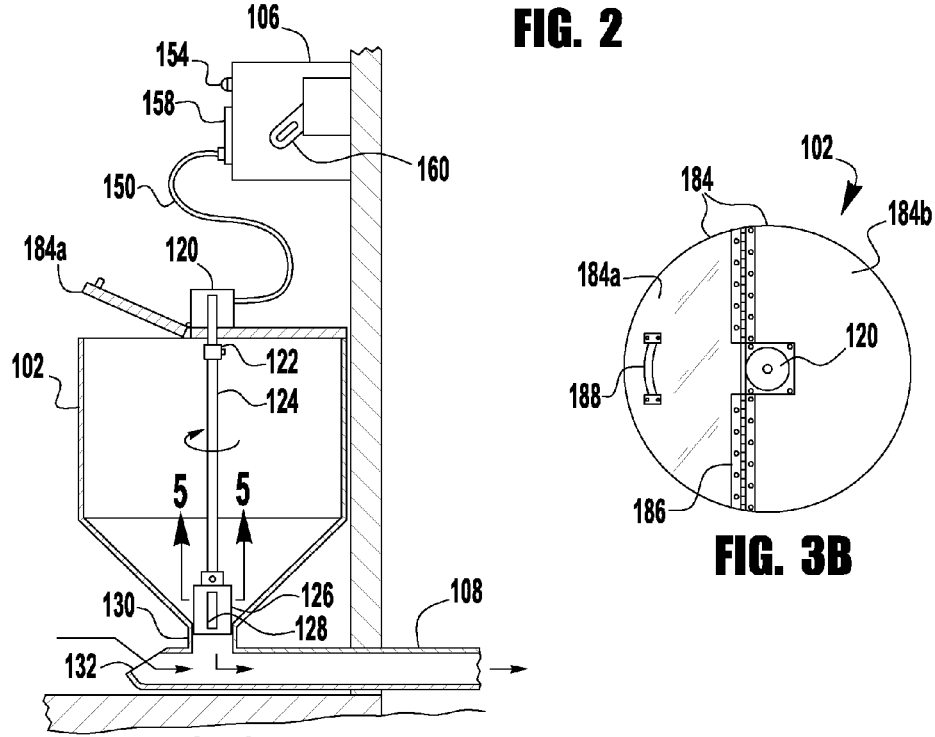
FIG. 3A
FIG. 3B

WATER SOFTENER SALT LOADING SYSTEM

CROSS-REFERENCE TO RELATED APPLICATIONS

This application claims the benefit of U.S. Provisional Patent Application No. 60/781,832, filed Mar. 13, 2006 by Michael J. Muniak.

TECHNICAL FIELD OF THE INVENTION

The present invention relates to water softeners or conditioners that use granulated/pelletized materials and, more particularly to a system for delivering or conveying the materials from a remote location to a loading opening of the water softener.

BACKGROUND OF THE INVENTION

Water conditioners, especially those that are called "water softeners", commonly are comprised of a conditioning tank and a brine tank. The water is "softened" as it passes through the conditioning tank where problem-causing calcium and magnesium ions in the water are replaced (by ion-exchange) with sodium ions. Since sodium does not precipitate out in pipes or react badly with soap, both of the problems of hard water are eliminated. To do the ion replacement, the water in the house runs through a bed of small plastic beads or through a chemical matrix called zeolite either of which fill the conditioning tank. The beads or zeolite are covered with sodium ions. As the water flows past the sodium ions, a chemical reaction occurs that exchanges the sodium ions for the calcium and magnesium ions. Eventually, the beads or zeolite contain mostly calcium and magnesium and the sodium is mostly depleted. At this point the softening process either stops or becomes very inefficient, such that the conditioning tank must be regenerated.

Regeneration involves soaking the beads or zeolite in a stream of sodium ions. Common salt is sodium chloride, so a very strong brine solution made by dissolving salt pellets in water is created in the brine tank and then flushed through the zeolite or beads. The brine solution displaces the calcium and magnesium that has built up in the zeolite or beads and replaces it again with sodium (ion exchange). The resulting solution of weak brine with calcium and magnesium is flushed out through a drain pipe.

Thus the brine tank must be refilled with salt periodically so that new brine can be created by dissolving the salt in water in the brine tank. The invention is primarily designed to address the problems associated with refilling a water softener brine tank with "salt", which preferably is in the form of pellets which are typically about ½ inch by ¾ inch oblongs that are purchased in bags weighing 40 or 80 pounds. The salt is also available in smaller pellets that are more granular like large gauge rock salt, but the larger pellets are preferable. The brine tank is typically located in a basement area and is loaded through a removably covered opening on the top of the brine tank, which is generally at least three feet above the floor level. The bags of salt are either purchased in a store and brought home in a personal vehicle, or may be delivered by a service. In either case the bags typically are in a garage or other outside storage area until they are needed. Carrying these rather heavy bags (40 to 80 pounds each) down to the basement and then lifting them high enough to dump into the top of the brine tank can prove to be difficult for many, and nearly impossible for elderly homeowners. Some have resorted to scooping the pellets out of the bag and into a much smaller pail, then carrying the pail downstairs and dumping into the tank. This works but can be very time consuming and tiring with many trips up and down the basement stairs and possibly also a step ladder by the tank.

Therefore a means for conveying salt pellets from a heavy bag at a remote location (e.g., a garage or carport) and delivering the pellets into a brine tank in the house (e.g., basement) is desirable. The system should be simple to minimize cost for consumer use, and should minimize the effort (e.g., lifting, carrying) required from the user such that even elderly and/or physically challenged individuals will be able to use it.

Pneumatic conveyors are known in the prior art. For example, U.S. Pat. No. 7,104,743 (Rainville et al.; 2006) discloses a vacuum receiver (10 in Rainville's FIG. 1) for a pneumatic conveyor for conveying, e.g., plastic pellets, having a receiving vessel (12) with a material inlet (14), a material outlet (20) and a conveying gas outlet (36). A conveying gas source (40), such as a vacuum pump, is connected via a connecting tube (38) to the conveying gas outlet. Material inlet (14) is connected to a granular material source (16) via a connecting tube (18). A mounting flange (32) is secured to the receiving vessel to facilitate mounting the receiving vessel in a desired position above a receiving hopper (24), which may, for example, be a supply hopper for a plastic molding machine. As seen more clearly in Rainville's FIG. 2, which is a sectional view of the vacuum receiver (10), a screen (34) is provided in front of the conveying gas outlet, the screen serving to separate conveyed particles, e.g. plastic pellets, from a stream of conveying gas, e.g. air, inside the vacuum receiver. A lid seal (28), is disposed between the receiving vessel (12) and the receiver lid (26) in order to provide a gas-tight closure. A powered discharge valve (52) is disposed in the material outlet (20). In operation, the material is drawn through the connecting tube from the material source to the receiver. When the receiver is sufficiently full with a batch of material, the vacuum pump is turned off and the discharge valve is opened to dump the material into the hopper.

The Rainville '743 patent describes a fairly sophisticated commercial apparatus. It is an object of the present invention to provide a simple, inexpensive system for home use, particularly for conveying pellets of salt to a water softener brine tank. The inventive device must convey relatively large oblong pellets (e.g., ½" by ¾"). It is an object that the pellets be loadable into the system from bags in a location remote from the brine tank, and furthermore that the loading process requires only a minimum of effort (e.g., lifting, carrying) from the user.

BRIEF SUMMARY OF THE INVENTION

According to the invention a water softener salt loading system is described, the water softener comprising a brine tank into the top of which salt must be periodically loaded, the salt being supplied in the form of pellets, the system comprising: a loading hopper having a loading opening no more than about 2.5 feet above the ground level by the loading opening; a pneumatic tube connected at a loading end to a discharge opening in the loading hopper, and at a receiving end to a tube discharge opening in a lid on top of the brine tank; a vacuum pump with an inlet opening in the brine tank lid and an outlet outside of the brine tank; a level controller configured to limit liquid in the brine tank to a maximum liquid level, thereby maintaining an air space between the maximum liquid level and the lid's pump inlet opening; an air-tight seal between the brine tank and the lid; and controls for turning the system "on" for salt conveying and "off" to stop conveying.

Other aspects of the invention include the following:
loading hopper is located remotely from the brine tank, the remote location being convenient for receiving bags of the salt.
screen over pump inlet
filter bag on pump outlet
hopper loading opening is less than 2.5 feet high
entraining air inlet at loading end of pneumatic tube
the salt pellets are oblong, having a length and a width
   a dispenser positioned in the hopper discharge opening extending upward therefrom, the dispenser comprising:
      cylindrical tube with OD~opening ID, rotatable on it's cylindrical axis, closed top, open bottom, longitudinal slot through the dispenser cylinder wall
      motor rotates dispenser when system is on for salt conveying
         controls configured to delay turning on the dispenser motor for a predetermined time period after the vacuum pump is started
      cyl ID is greater than pellet width
         circumferential slot width is greater than pellet width
drop door in tank lid with spring biased closed upward
   controls include a dump switch configured to detect when the lid above the drop door is full of conveyed salt, and to turn off the vacuum pump, thereby allowing the lid to dump the salt into the brine tank.
controls include a sensor configured to detect when the brine tank has been filled, and use the sensor's output to stop the salt conveying.
controls include a timer switch configured to turn off the power to a conveying element.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Such relationships, if any, between similar elements in the same or different figures will become apparent throughout the specification, including, if applicable, in the claims and abstract.

Figure 1:
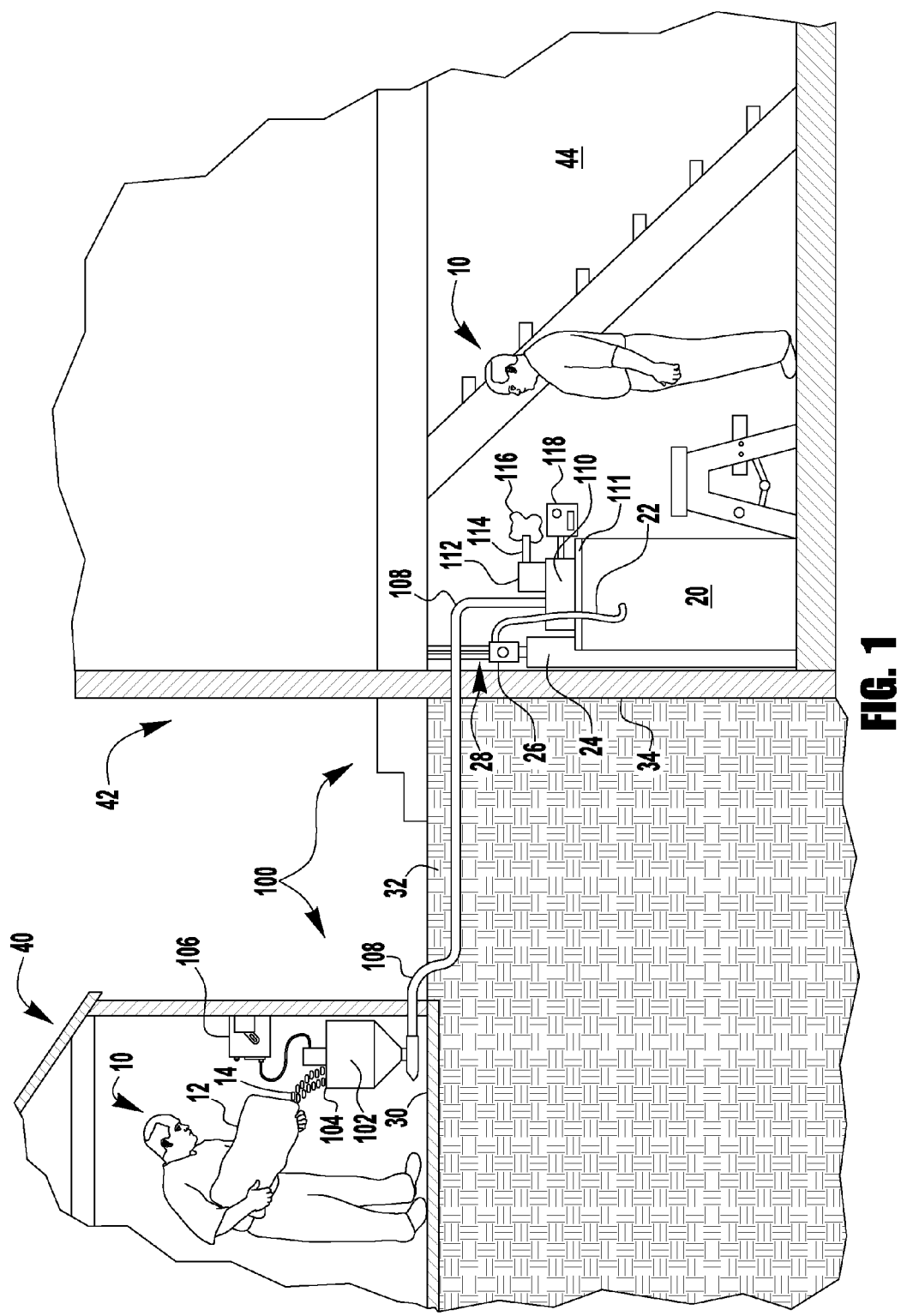

The structure, operation, and advantages of the present preferred embodiment of the invention will become further apparent upon consideration of the following description taken in conjunction with the accompanying drawings, wherein:

FIG. 1 is a side cross sectional view of an exemplary installation of a salt loading system embodiment according to the invention.

FIG. 2 is an illustrative view of bags of salt being poured into a loading hopper of the salt loading system according to the invention.

FIGS. 3A and 3B are side cross sectional and top views, respectively of the loading hopper end of the salt loading system according to the invention.

Figure 4:
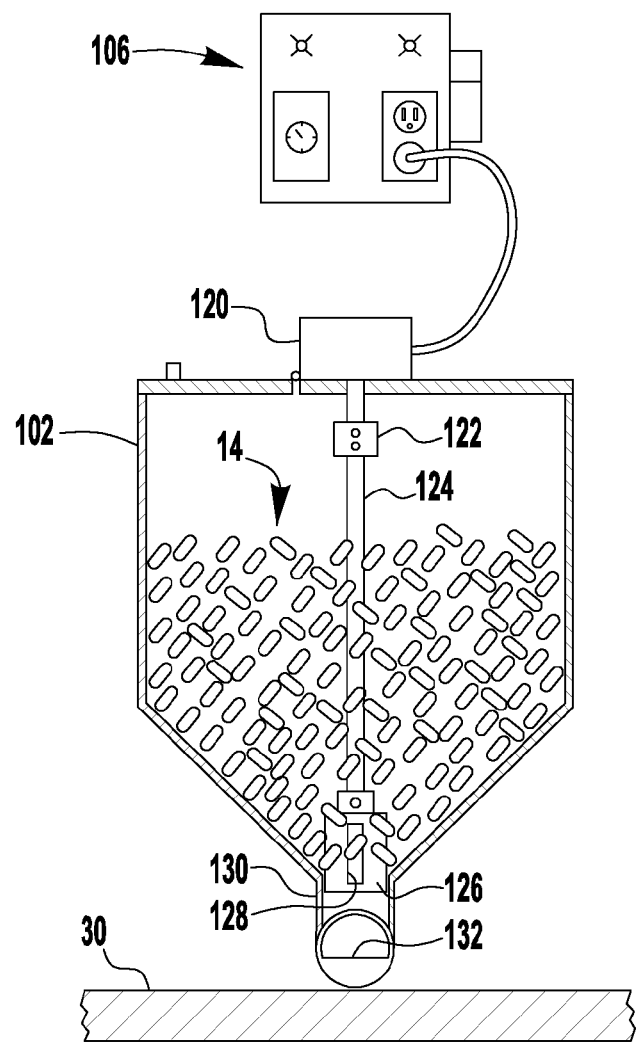

FIG. 4 is a side cross sectional view of the hopper partially filled with oblong pellets of salt, all according to the invention.

Figure 5:
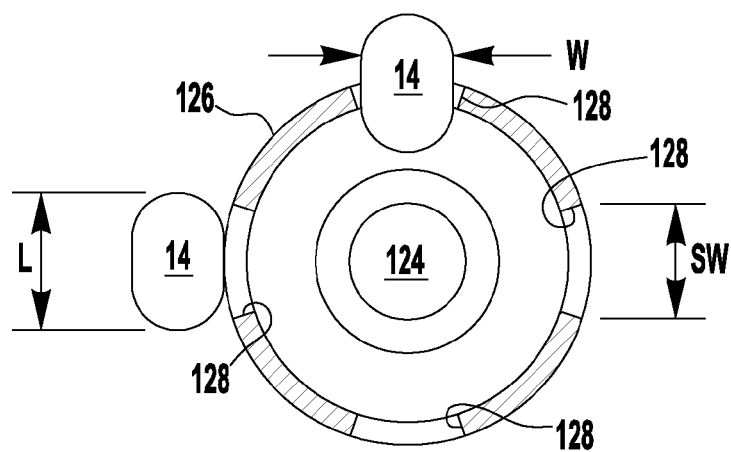

FIG. 5 is a bottom cross sectional view, taken along the line 5-5 in FIG. 3A, of a dispenser and two oblong pellets of salt, all according to the invention.

Figure 6:
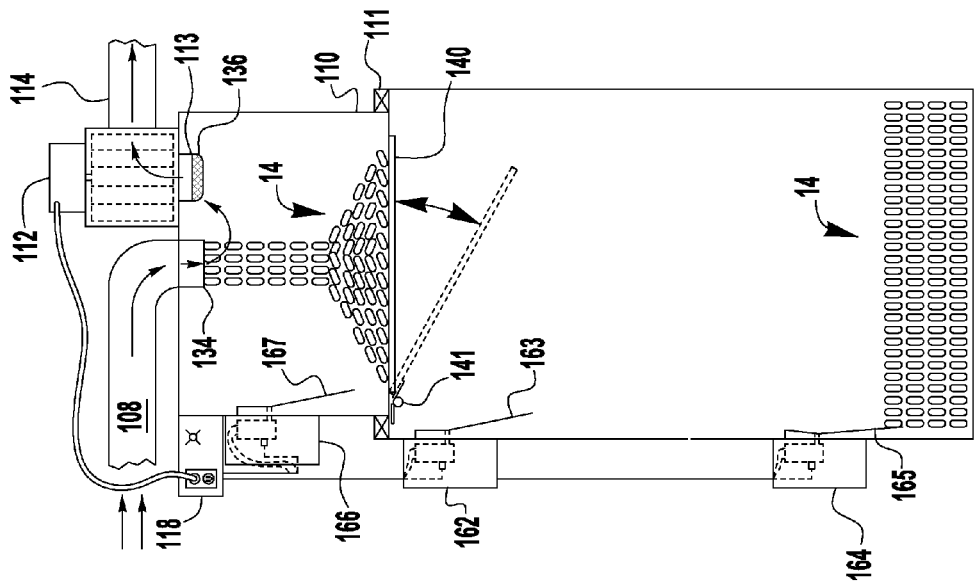

FIG. 6 is a side view of a brine tank with added inventive controls and lid, the tank and lid being illustrated as transparent, all according to the invention.

Figure 7:
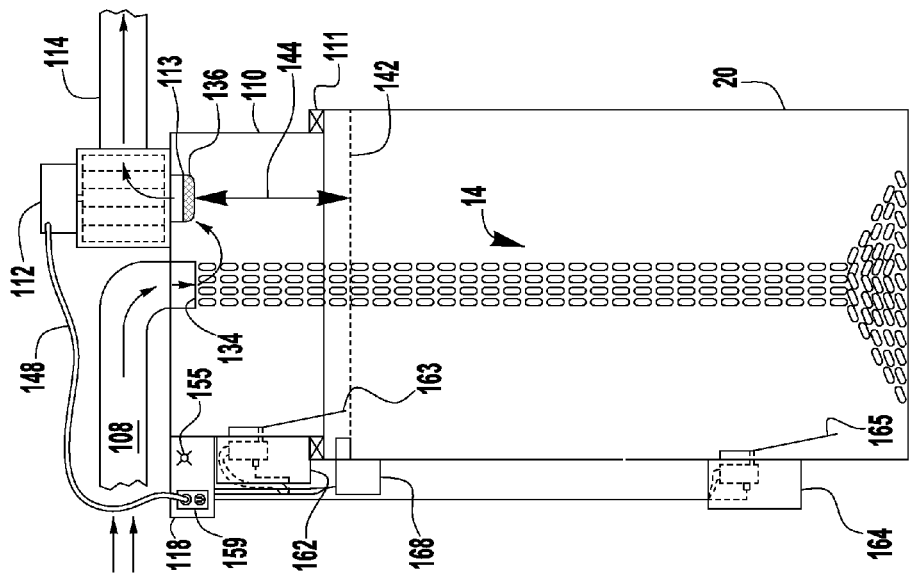

FIG. 7 is a side view of a brine tank with added inventive controls and a drop box embodiment of the lid, the tank and lid being illustrated as transparent, all according to the invention.

Figure 8:
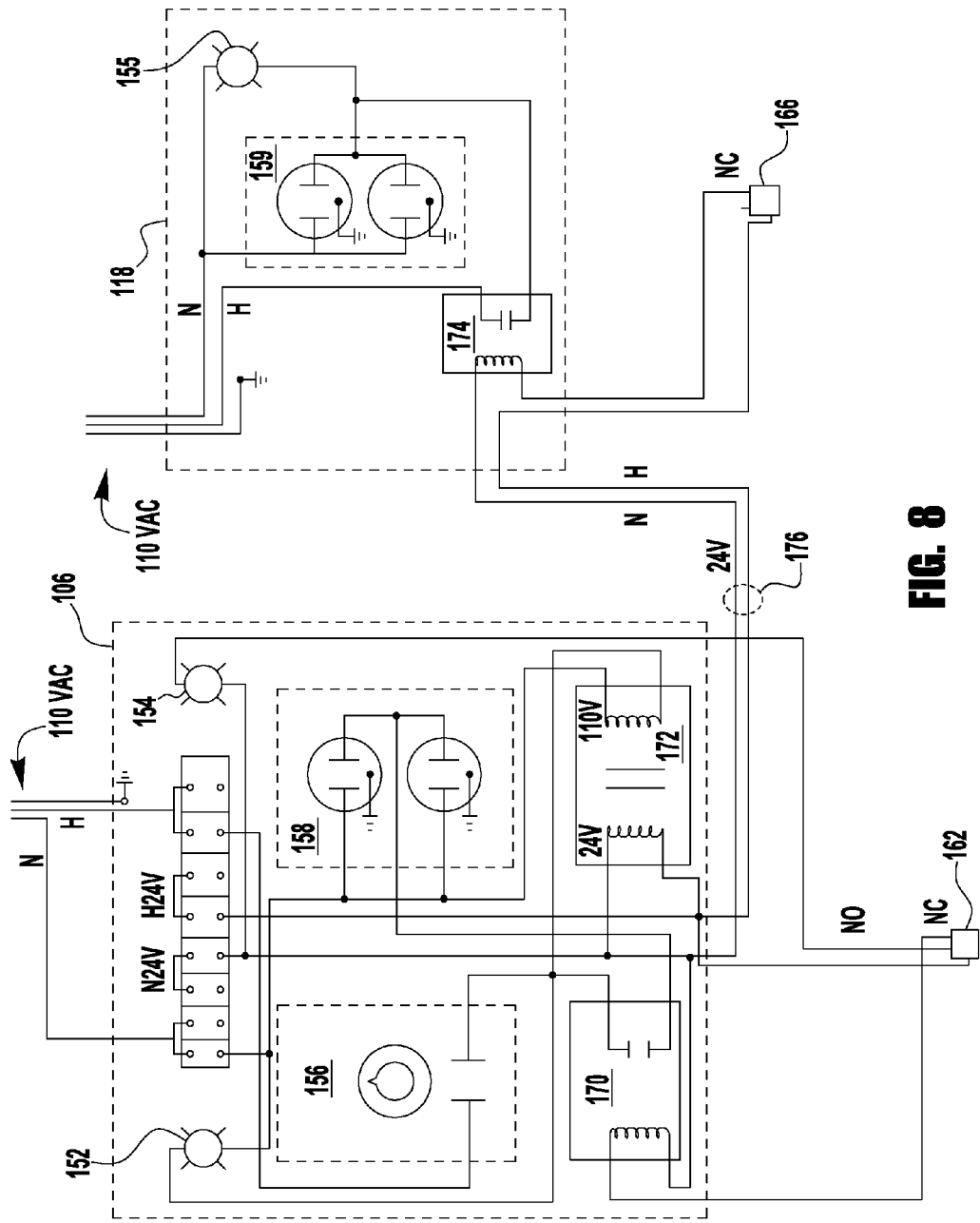

FIG. 8 is a schematic of an exemplary embodiment of a control system for the salt loading system according to the invention.

DETAILED DESCRIPTION OF THE INVENTION

The problem addressed by the present invention is illustrated in FIG. 1, which also shows an embodiment of the inventive solution, the water softener salt loading system 100 (system 100 for short). Generally speaking, two digit reference numbers are used to indicate environmental elements, while three digit reference numbers are used to indicate elements of the inventive system 100. On the left is a garage 40 within which the user 10 has at least one bag 12 of water softener "salt" pellets 14, the bag typically weighing at least 40 pounds. The salt bag(s) 12 may have been delivered there by a service, or purchased and brought there in the user's car. Since the user's water softener is in a basement 44 of the user's house 42, the user 10 must carry the heavy bag 12 from the garage 40 to the house 42, in through at least one door and down at least one stairway. Once in the basement the user must then carry the bag 12 to a brine tank 20 of the water softener, and then lift the heavy bag 12 enough to pour the salt pellets 14 into an open top of the brine tank 20. If the user 10 is not strong enough to lift the bag 12 high enough, he may use a step stool—an action that is potentially dangerous. The inventive system 100 allows the user 10 to load the brine tank 20 by simply pouring the bag 12 into a low-lying loading hopper 102 that is located in the garage 40, thereby minimizing the lifting effort and practically eliminating the bag 12 carrying.

A generic water softener is illustrated in the basement 44. It includes a conditioning tank 24, topped by a flush valve 26 through which unconditioned water inlet and conditioned (softened) water outlet pipes 28 pass. A flushing hose 22 extends between the flush valve 26 and the brine tank 20. In this illustration, the flush valve 24 directs unconditioned water to the brine tank 20 when it is to be filled, and directs brine solution from the brine tank 20 through the flush hose 22 and through the conditioning tank 24 for regeneration. This process may be automated or manually controlled. For example, a metering valve (not shown) in the flush valve 24 could be used to control the amount of water filled into the brine tank 20, such that the brine tank 20 will not overflow.

The generic brine tank 20 has an open top that is covered or closed by a removable lid (not shown). In FIG. 1, the generic lid has been replaced by an inventive lid 110 that is connected to the brine tank 20 by an air-tight seal (e.g., a gasket) 111. A vacuum pump 112 and a pneumatic tube 108 are connected to, and extend out of, the lid 110. An outlet 114 of the vacuum pump 112 is preferably covered by a filter bag 116 to control dust dispersal. Alternatively, the outlet 114 can be piped outdoors (not shown). A secondary control box 118 has electrical controls and power (described hereinbelow) that communicate with other system elements such as the vacuum pump 112. The pneumatic tube 108 is, for example, 2" PVC pipe that is plumbed to pass through an exterior house wall 34 and to extend to the remotely located loading hopper 102 that is, for example, located in the garage 40. Bends in the tube 108 are preferably rounded and/or gradually curved rather than squared-off. For protection, the tube 108 is preferably buried in the ground 32. A main control box 106 for the system 100 is located near by, and in electrical communication with, the loading hopper 102.

FIGS. 2, 3A and 3B illustrate the loading end of the system 100. The loading hopper 102 has a loading opening 104 that is located a height H above the garage floor 30 nearby the loading opening 104. Thus the height H is the minimum height that the salt bag 12 must be raised in order to pour the salt pellets 14 through the loading opening 104 into the loading hopper 102; therefore a key element of the inventive system 100 is a loading height H that is low enough to enable the average person 10 to pour the bag 12 with a minimum of lifting effort. Therefore the loading opening 104 should be no higher than a loading height H of about 2.5 feet.

The loading hopper 102 is preferably covered by a dust cover 184 having a fixed portion 184b and an openable portion 184a, for example connected by a hinge 186. A lifting handle 188 may be supplied as well. Mounted above the loading hopper 102, preferably on the cover 184, is a dispenser motor 120 that is powered by a cord 150 extending to the main control box 106, e.g., plugged into a dispenser motor receptacle 158. The main control box 106 also has a main power switch 160, a timer 156, an "on" light 152 and a "tank full/stop" light 154.

The loading hopper 102 is generally round with a tapered bottom leading to a round discharge opening 130 at the bottom. The discharge opening 130 opens into the pneumatic tube 108, which extends in one direction to the brine tank lid 110, and in another direction to an entraining air inlet 132, the opening of which is preferably directed away from the floor 30 to avoid picking up dirt and/or moisture from the floor 30. If the entraining air inlet 132 is located fairly close to the discharge opening 130, then an upward turn as shown will help contain any salt pellets 14 that might fall out of the discharge opening 130 when the air is not flowing. Such a close location also permits using a rod to clear the pneumatic tube 108 of a blockage below the discharge opening 130.

It can be seen that when the vacuum pump 112 is pulling air through the pneumatic tube 108 the strong flow of air entering the air inlet 132 will entrain and carry pellets 14 with it through the pneumatic tube 108. This entraining process is most effective if the pellets 14 do not drop out of the hopper 102 so fast that they pile up. To meter the pellets 14 through the discharge opening 130 an inventive dispenser 126 is turned in the opening 130 by the dispenser motor 120. A turning shaft 124 is coupled 122 to the motor 120 and the dispenser 126. The dispenser motor has sufficient horse power to rotate the dispenser 126 when the loading hopper 102 is full of pellets 14 as shown in FIG. 4. It is preferred that the dispenser 126 rotate at a speed that will not damage the salt pellets 14, but still fast enough to effectively dispense a steady metered flow of the pellets 14. Preferred revolution rates of the dispenser 126 would range between about 4 and 15 RPM. Referring especially to FIG. 5, a feature of the dispenser 126 is that it has one or more longitudinal slots 128 through the dispenser cylinder wall that are sized relative to the pellet size and shape. The salt pellets are typically oblong, having a length L and a width W that is smaller than the length L. The dispenser 126 is positioned in the hopper discharge opening 130 and extends upward therefrom. The dispenser 126 is a cylindrical tube with an outside diameter slightly smaller than the inside diameter of the discharge opening 130, is rotatable on it's cylindrical axis, has a closed top and an open bottom. The longitudinal slots 128 have a slot width SW that is larger than the pellet width W but smaller than the pellet length L. Thus the pellets 14 will tend to lie across the slots 128 except when the dispenser 126 is rotating. Edges of a moving slot 128 tend to turn the pellets in a way that they can pass through the slot 128. Thus the slots 128 are, for example, about 0.75" by 2.0" rectangular openings for "large pellets" that are about 0.50" by 0.75", and much smaller for more granular pellets.

FIG. 6 shows a first, simplified embodiment of a receiving end of the inventive system 100 at the brine tank 20. This embodiment is especially appropriate for "building in" to the brine tank 20. The pneumatic tube 108 ends at a tube discharge opening 134 in the inventive lid 110 on top of the brine tank 20. The vacuum pump 112 has an inlet opening 113 also in the lid 110. A protective screen 136 preferably covers the inlet opening 113 to prevent larger pellet debris from entering and possibly damaging the vacuum pump 112. A liquid level controller 168 is configured to limit liquid in the brine tank 20 to a maximum liquid level 142, thereby maintaining an air space 144 between the maximum liquid level 142 and at least the lid's vacuum pump inlet opening 113. Preferably this also maintains an air space 144 between the maximum liquid level 142 and the tube discharge opening 134. It may be noted that an equivalent of the liquid level controller 168, shown as a physical detector in FIG. 6, can also be a timer or other control that limits the liquid filling level (e.g., the flush valve 26). In addition, an optional "full" sensor/switch 162, 163 will work with the controls to limit the filling height of the salt pellets 14. It can be seen that, given the air space 144 (for at least the inlet opening 113) the vacuum pump 112 will draw air out of the air space 144 in the lid 110, thereby creating a negative pressure in that area which is air-tight sealed 111 except for the tube discharge opening 134 into the pneumatic tube 108. Thus air is pulled through the pneumatic tube 108 from the loading hopper 102 and, entrained with it, salt pellets 14, which are too heavy to be raised into the inlet opening 113 and thus fall down into the brine tank 20. The secondary control box 118 receives wires from sensors 162, 168, 164 and supplies 110 VAC power to the vacuum pump 112 via a cord 148 that is, for example, plugged into the pump receptacle 159. A "pump on" indicator light 155 is optionally provided.

A tank empty sensor/switch 164 has a feeler arm 165 that is depressed whenever pellets 14 are filled high enough in the brine tank 20 to do so, thereby indicating that the tank is not empty, as in FIG. 7.

FIG. 7 shows a second embodiment of the receiving end of the system 100; in this case incorporating a form of drop box. In addition to the already described elements, a drop door 140 is spring biased 141 to close upward against the lid 110, the spring 141 being sufficiently strong to seal the door 140 closed when there is no weight on it. The controls include a dump switch 166 with a feeler to detect when pellets 14 are piled to a predetermined height above the drop door 140. This assumes, of course, that the vacuum pump 112 is specified to create a negative pressure in the lid 110 that is sufficient to pull the drop door 140 upward in its sealed position. When the dump switch 166 is triggered it turns off the vacuum pump 112, thereby releasing the drop door 140 so that it falls open downward under the weight of the accumulated pellets 14. Once the pellets 14 slide off, the spring 141 closes the door 140 and the vacuum pump 112 has been turned back on by the now un-triggered dump switch 166. The cycle is repeated until the full sensor 162 turns off the vacuum pump 112. If the optional full sensor 162 is not used, then the timer 156 can be set to a time known to fill the brine tank 20 with pellets 14.

In order to assist in moving and leveling the salt pellets 14 (especially the granular form), an optional vibrator (not shown) can be attached to or incorporated within either or both of the loading hopper 102 and the drop box portion of the brine tank lid 110.

A schematic of an exemplary control system is shown in FIG. 8. A 24 volt control line 176 runs between the main control box 106 at the loading hopper 102 and the secondary control box 118 at the brine tank 20. Such a low voltage control line can easily be run along with the pneumatic tube 108. The controls utilize 110 VAC power for the two motors fed by the dispenser power outlet 158 and the pump power outlet 159. From there, power is stepped down to a 24 VAC control voltage by means of a transformer 172. The 110 VAC can be controlled by a master timer/relay 156 as shown. The dispenser motor 120 is controlled by a dispenser relay 170 that is turned off when the full switch 162 is triggered. When a dump switch 166 is utilized, then it controls a pump relay 174 which in turn switches the vacuum pump power on/off.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A water softener salt loading system, including a water softener comprising a brine tank into the top of which salt must be periodically loaded, the salt being supplied in the form of pellets, the system comprising:
   a loading hopper having a loading opening at a height (H) above ground level by the loading opening, wherein the height (H) is less than a corresponding height of the top of the brine tank;
   a pneumatic tube connected at a loading end to a discharge opening in the loading hopper, and at a receiving end to a tube discharge opening in a lid on top of the brine tank;
   a vacuum pump with an inlet opening in the brine tank lid and an outlet outside of the brine tank;
   a level controller configured to limit liquid in the brine tank to a maximum liquid level, thereby maintaining an air space between the maximum liquid level and the lid's pump inlet opening;
   an air-tight seal between the brine tank and the lid; and
   controls for turning the system "on" for salt conveying and "off" to stop conveying.

2. The system of claim 1, wherein:
   the loading hopper is located remotely from the brine tank, in a location that is convenient for receiving bags of the salt.

3. The system of claim 1, further comprising:
   a screen over the pump inlet.

4. The system of claim 1, further comprising:
   a filter bag on the pump outlet.

5. The system of claim 1, further comprising:
   an entraining air inlet at the loading end of the pneumatic tube.

6. The system of claim 1, wherein:
   the salt pellets are oblong, having a length greater than a width, and
   the system further comprises a dispenser positioned in the loading hopper discharge opening and extending upward therefrom, the dispenser comprising a hollow cylindrical dispenser cylinder, rotatable on its cylindrical axis, and having:
   a tubular wall outside diameter approximately equal to an inside diameter of the hopper discharge opening within which a bottom end of the dispenser cylinder is rotatably positioned,
   a closed top end,
   an open bottom end, and
   a longitudinal slot dispensing opening passing through the dispenser cylinder tubular wall.

7. The system of claim 6, further comprising:
   a dispenser cylinder inside diameter that is greater than the pellet width;
   a dispensing opening slot width that is greater than the pellet width and less than the pellet length; and
   a dispensing opening slot height that is greater than the pellet length.

8. The system of claim 6, further comprising:
   a dispenser motor connected to rotate the dispenser cylinder on its cylindrical axis when the system is turned on for salt conveying.

9. The system of claim 8, further comprising:
   controls configured to delay turning on the dispenser motor for a predetermined time period after the vacuum pump is started.

10. The system of claim 1, further comprising:
    a drop box in the brine tank lid, comprising a chamber that is open to the pneumatic tube discharge opening and the vacuum pump inlet opening; and is sealingly closed at the bottom of the lid by a hinged drop door that is spring biased toward closing the door upward against the bottom of the lid.

11. The system of claim 10, wherein:
    the spring bias is configured to allow the drop door to drop when the weight of the conveyed salt in the chamber reaches a predetermined limit;
    thereby dumping the conveyed salt into the brine tank, which un-weights the drop door so that it can close again.

12. The system of claim 10, further comprising:
    a dump switch control that is configured to detect when the lid chamber above the drop door has a predetermined fill amount of conveyed salt, and thereupon to turn off the vacuum pump;
    thereby allowing the drop door to drop under the weight of the conveyed salt to dump the salt into the brine tank.

13. The system of claim 1, wherein the controls further comprise:
    a salt level sensor configured to detect when the brine tank has been filled with salt, and thereupon to turn the system off to stop conveying salt.

14. The system of claim 1, wherein:
    the height (H) is minimized to be no more than about 2.5 feet.

* * * * *